United States Patent
Perrier et al.

(10) Patent No.: US 10,134,153 B2
(45) Date of Patent: Nov. 20, 2018

(54) SYSTEM AND METHOD FOR IMAGE GENERATION BASED ON VEHICLE IDENTIFICATION NUMBER

(71) Applicant: Autodata Solutions, Inc., El Segundo, CA (US)

(72) Inventors: Gregory T. Perrier, London (CA); Jason K. Nethercott, Union (CA)

(73) Assignee: Autodata Solutions, Inc., El Segunco, CA (US)

(*) Notice: Subject to any disclaimer, the term of this patent is extended or adjusted under 35 U.S.C. 154(b) by 151 days.

(21) Appl. No.: 15/015,058

(22) Filed: Feb. 3, 2016

(65) Prior Publication Data
US 2017/0221229 A1    Aug. 3, 2017

(51) Int. Cl.
| | | |
|---|---|---|
| G06T 11/00 | (2006.01) | |
| G06F 17/30 | (2006.01) | |
| G06Q 30/06 | (2012.01) | |
| G06T 5/50 | (2006.01) | |

(52) U.S. Cl.
CPC ........ G06T 11/00 (2013.01); G06F 17/30265 (2013.01); G06Q 30/0641 (2013.01); G06T 5/50 (2013.01); *G06T 2207/20221* (2013.01)

(58) Field of Classification Search
CPC . G06T 11/00; G06T 5/50; G06T 2207/20221; G06F 17/30265; G06Q 30/0641
See application file for complete search history.

(56) References Cited

U.S. PATENT DOCUMENTS

| | | | |
|---|---|---|---|
| 9,183,569 B1* | 11/2015 | Anderson | G06Q 30/0276 |
| 9,805,263 B2* | 10/2017 | Schneider | G06K 9/00671 |
| 2007/0052973 A1* | 3/2007 | Yamaguchi | G01M 17/007 356/600 |
| 2011/0269424 A1* | 11/2011 | Multer | H04L 67/1095 455/411 |
| 2012/0019534 A1* | 1/2012 | Aoki | G06F 3/1415 345/428 |
| 2013/0262241 A1* | 10/2013 | Nelson | G06Q 10/087 705/14.72 |
| 2015/0019533 A1* | 1/2015 | Moody | G06F 17/30864 707/722 |
| 2016/0086585 A1* | 3/2016 | Sugimoto | G09G 5/391 345/668 |
| 2016/0100087 A1* | 4/2016 | Scheich | H04N 5/2256 348/47 |

\* cited by examiner

*Primary Examiner* — Jwalant Amin
(74) *Attorney, Agent, or Firm* — Rutan & Tucker, LLP (57) ABSTRACT

An embodiment of the invention is directed to a system that comprises one or more processors and a memory communicatively coupled to the one or more processors. Herein, the memory including logic that, upon executing by the one or more processors and in response to receiving information that uniquely identifies a vehicle, automatically generating a plurality of images of the vehicle. A vehicle identification number (VIN) may be used as the information that uniquely identifies a vehicle and causes automatic generation of the interior and exterior images for that specific vehicle.

20 Claims, 7 Drawing Sheets

SYSTEM AND METHOD FOR IMAGE GENERATION BASED ON VEHICLE IDENTIFICATION NUMBER

FIELD

Embodiments of the disclosure relate to the field of image rendering. More specifically, one embodiment of the disclosure relates to an automated system that, responsive to receipt of a vehicle identification number, automatically generates vehicle images customized for a specific dealer.

GENERAL BACKGROUND

In most geographic areas around the world, vehicles are used by persons as a mode of transportation from one geographic location to another. Currently, there are many types of vehicles used for transportation. One type of vehicle is an automobile that includes a chassis supported by four or more wheels (e.g., a car or a truck). Another type of vehicle is a motorized two-wheeled vehicle, which may be in the form of a motorcycle or a scooter. All of these vehicles allow a person to travel a greater distance in a shorter period of time than the person could travel by foot.

In many cases, these vehicles are purchased from a third-party provider, sometimes referred as a "dealer", who may operate as an agent for a manufacturer. For instance, an automobile manufacturer may have hundreds or thousands of dealers at different locations around the world. Depending on the locations of these dealers, the dealer may have to compete against dealers selling other types of automobiles as well as dealers selling the same automobiles in a neighboring geographic region (e.g., neighboring city, neighboring county, etc.).

With the increased popularity of the Internet over the last decade, a greater amount of purchasing decisions are being made after reviewing materials on a dealer's website. For instance, a potential customer may access a website of a dealer to review the dealer's vehicle inventory. More specifically, potential customers may review the images for certain vehicles of interest (e.g., exterior and interior images of the vehicle) to determine if the dealer has a particular vehicle of interest and possibly which dealer to visit if she or he wants to inspect the vehicle before purchasing.

In some cases, these vehicle images are "lot" images, namely digital photographs of the actual vehicle that are taken by the dealer or by a professional photographer hired by the dealer. For these images, the exterior and/or interior of the vehicle are captured along with the actual area surrounding the vehicle during the photoshoot (e.g., parking lot, parking garage, etc.). The area surrounding the vehicle offers little assistance in differentiating a dealer from its competitors and the use of lot images greatly increases the dealer's overall marketing costs. Also, when the lot images are taken by the dealer, in some cases, these images may include artifacts (e.g., window glare, shadows, less than optimal resolution, etc.), which impede conveyance of the actual features of the vehicle.

In other cases, the vehicle images may be generic representations (stock image) for the specific vehicle make/model/trim, and thus, the images may not accurately represent the specific vehicle of interest. As an example, the automobile of interest may include a particular factory-ordered option, such as a navigation system with a compact disc (CD) player for example. However, the stock images and lot images may merely illustrate the interior color and a generic interior layout, not each and every factory-ordered option desired included on the specific (actual) vehicle such as the CD player option with the navigation system.

The lack of accurate representations of a specific vehicle of interest along with customized dealer background and/or foreground information may adversely affect a potential customer's decision to purchase the vehicle from that dealer.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

One embodiment of the disclosure is directed to an automated system that generates one or more vehicle images customized for a specific dealer in response to receipt of a vehicle identification number (VIN) as input, without any further human intervention. Representing different viewing angles, the vehicle images may be generated in real-time, responsive to an entry of the VIN. As another feature, each vehicle image may be positioned to overlay a dealer-specific background thereby producing an updated vehicle image, where different vehicle images may overlay the same dealer-specific background or different dealer-specific backgrounds. As another feature, foreground data may be positioned to overlay the updated vehicle images to produce corresponding composite vehicle images.

More specifically, in response to receipt of a VIN provided from any one of a plurality of sources, the VIN is utilized by VIN analysis logic to recover information that identifies the vehicle trim for the specific vehicle uniquely identified by the VIN along with the factory-ordered options installed on the specific vehicle. According to one embodiment of the disclosure, the information associated with the vehicle trim may include a vehicle trim code and the information associated with the factory-ordered options may include built vehicle option codes.

According to one embodiment of the disclosure, the recovered trim code and built vehicle option codes are retrieved by conducting a lookup of the "build data," namely a collection of data normally provided by an original equipment manufacturer (OEM) that correlates a VIN with both the vehicle trim and the factory-ordered options, as described below. In combination with this embodiment, or in the alternative, the recovered trim code and/or built vehicle option codes may be obtained by decoding the VIN, namely analysis of the alphanumeric characters of the VIN themselves, where these alphanumeric characters provide information that identifies the vehicle trim for the specific vehicle and/or the factory-ordered options installed on the specific vehicle.

In response to receipt of the vehicle trim code and the built vehicle option codes, the VIN analysis logic adds information to a record associated with a particular vehicle and dealer. At initial processing, the "record" may include, but is not limited or restricted to the following parameters: (1) VIN that identifies a particular vehicle for which images are sought, (2) the dealer information including a dealer code that identifies a specific dealer who is currently responsible for selling the particular vehicle, (3) the vehicle trim code that identifies a trim package associated with the particular vehicle, which may be represented as part of its vehicle model (e.g., Chevrolet® Camaro® SS or RS), and/or (4) built vehicle option codes associated with the factory-ordered options installed on the specific vehicle identified by the VIN. With continued processing, the record may be augmented to include additional parameters including but not limited or restricted to (5) catalog information and/or (6) the one or more images of the vehicle, which may include (a) a vehicle image, (b) a background, (c) a foreground, and (d) a composite vehicle image that includes the vehicle image as well as a selected background and foreground for that vehicle image, as described below.

Communicatively coupled to the VIN analysis logic, vehicle data collection logic is configured to receive the record of one or more parameters associated with the record, including VIN, dealer information (perhaps received with the VIN), the vehicle trim code, and/or the built vehicle option codes. The vehicle data collection logic accesses one or more resources to gather additional information directed to one or more of these parameters. This information, sometimes referred to as "catalog information," may be directed to the vehicle, the dealer, trim and/or the factory-ordered options for the vehicle and may originate from one or more resources. The one or more resources (referred to as "resource(s)") may include a marketing department, an original equipment manufacturer (OEM) such as an automobile manufacturer (e.g., General Motors, Nissan, Toyota, or the like) or a representative thereof, and/or a third-party resource. The catalog information may be included as part of the record.

Thereafter, the record (or alternatively metadata associated at least a portion of the record such as the built vehicle option codes and vehicle trim code) is provided to vehicle image layering logic, which controls the selection and layering of images associated with different components of the vehicle. More specifically, the vehicle image layering logic selects a subset of images that illustrate visible components of the vehicle having a particular colored exterior and interior (referred to as "component images") for each desired viewing angle of the exterior and/or interior (e.g., front view, side views, rear view, rear elevate view, front elevated view, dash view, front seat view, rear seat view, etc.). The selection of component images is based, at least in part, on the built vehicle option codes and the vehicle trim code. Additionally, based on the selected viewing angle, the vehicle image layering logic determines a prescribed overlay scheme for the subset of component images. Hence, the vehicle image layering logic arranges different subsets of component images in accordance with the prescribed overlay scheme in order to render a plurality of vehicle images that accurately illustrate the exterior and/or the interior of the vehicle (including all factory-ordered options). The layered vehicle images may be included as part of the record.

Thereafter, the record (or alternatively metadata associated at least a portion of the record such as the dealer code and layered vehicle images) is provided to (dealer-specific) background insertion logic. The background insertion logic is configured to determine, based on analysis of the dealer code, whether the dealer has requested specific background images for its vehicle images. If so, one or more dealer-specific background images are obtained and the layered vehicle images are applied to these dealer-specific background images. It is contemplated that the selection of which particular dealer-specific background image is used for which layered vehicle image may be based, at least in part, on the viewing angle of that layered vehicle image. As a result, the same or different dealer-specific background images may be used for layered vehicle images offering different viewing angles. Each layered vehicle image may be positioned to overlay a selected dealer-specific background image to create an updated layered vehicle image (referred to as "updated vehicle image"). The updated vehicle images may be included, albeit temporarily, as part of the record.

The record (or alternatively metadata associated at least a portion of the record such as the updated vehicle images and/or dealer code) are provided to (dealer-specific) foreground insertion logic. The foreground insertion logic is responsible for controlling an overlay of data that is specific to the dealer on the updated vehicle images to produce composite vehicle images for use by a particular dealer. The composite vehicle images may be included, albeit temporarily, as part of the record.

The record (or alternatively metadata associated at least a portion of the record such as the composite vehicle images and/or dealer code) may be provided to dynamic resizing logic, which controls any resizing of the composite vehicle images in accordance with the needs of the specific dealer. For instance, a composite vehicle image having a first resolution (2048×1028 pixels) may be resized to a second resolution (800×600) less than the first resolution based on the intended use of the composite vehicle image by that particular dealer. For instance, the composite vehicle images for display on mobile applications may undergo a reduced resolution to resize these vehicle images for faster rendering on a targeted device (e.g., smartphone). These resized, composite vehicle images are made available to the dealer. The resized, composite vehicle images may be made available by placement in a file that is provided during a file transfer protocol (FTP) communication session, by transmission of a message that includes either one or more Uniform Resource Locators (URLs) each associated with a resized, composite vehicle image, or the like.

I. TERMINOLOGY

In the following description, certain terminology is used to describe features of the invention. For example, in certain situations, the term "logic" is representative of hardware, firmware or software that is configured to perform one or more functions. As hardware, logic may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

Alternatively, the logic may be software, such as executable code in the form of an executable application, an Application Programming Interface (API), a subroutine, a function, a procedure, an applet, a servlet, a routine, source code, object code, a shared library/dynamic load library, or one or more instructions. The software, when executed, performs certain functionality (i.e. process). The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "network device" should be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a network device may include, but are not limited or restricted to, the following: a server, an endpoint device (e.g., a laptop, a smartphone, a tablet, a desktop computer, a netbook, a medical device, or any general-purpose or special-purpose, user-controlled electronic device); a mainframe; a router; or the like.

The term "interconnect" may be construed as a physical or logical communication path between two or more network devices. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

A "message" generally refers to information transmitted in one or more electrical signals that collectively include electrically storable data in a prescribed format. Each message may be in the form of one or more packets, frames, HTTP-based transmissions, part of a data stream, or any other series of bits having the prescribed format.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. GENERAL ARCHITECTURE

Figure 1:
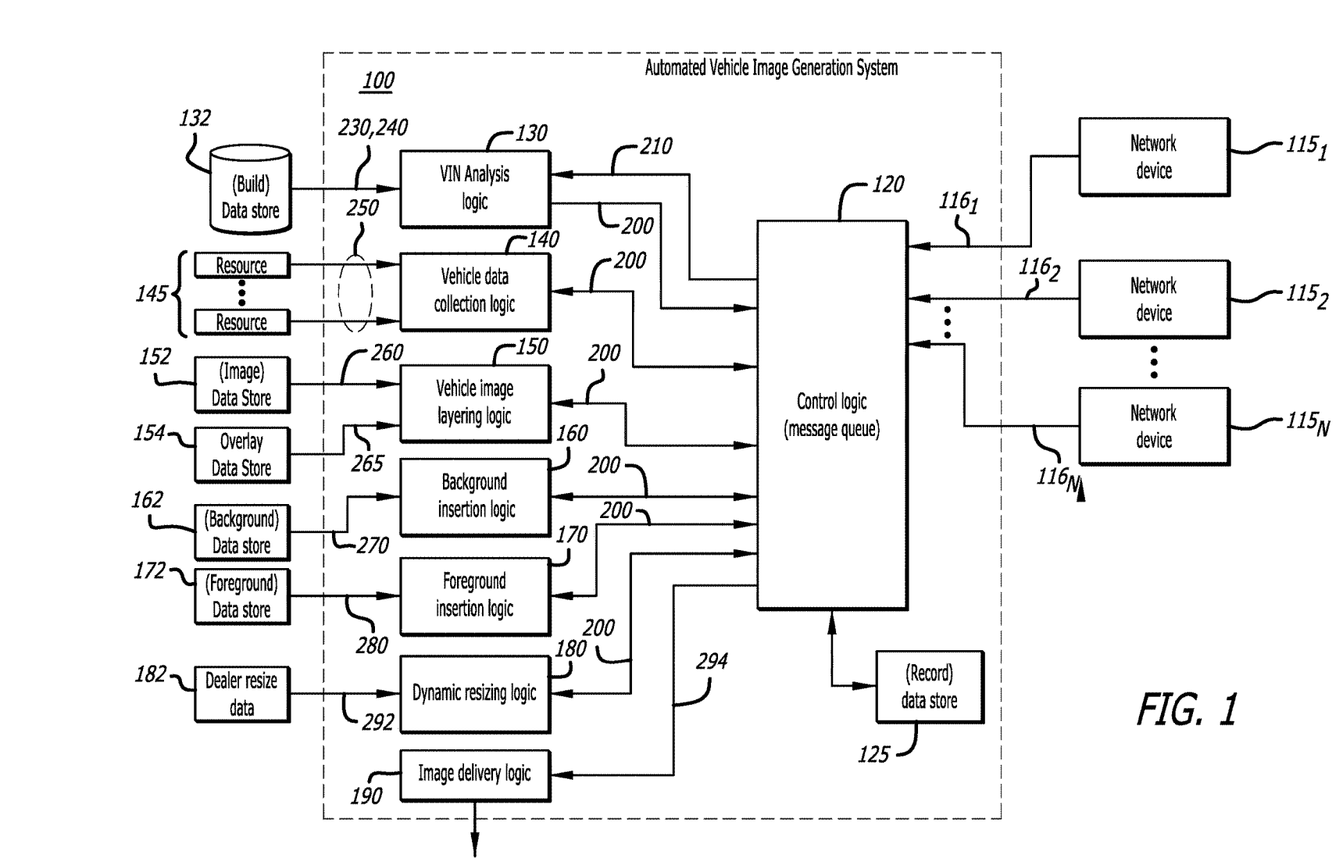
FIG. 1 is an illustrative embodiment of an exemplary automated system for generating images of a vehicle based on a unique identifier, such as a vehicle identification number (VIN), assigned to the vehicle.

Referring to FIG. 1, an exemplary block diagram of a centralized, automated vehicle image generation system 110 deployed as part of a network 100 is described herein. Herein, the network 100 may be a single network (e.g., public network) or a collection of networks, such as a public network and/or a private network (e.g., an organization or enterprise network) for example. The network 100 enables one or more network devices $115_1$-$115_N$ (N≥1) to communicate with the automated vehicle image generation system 110. According to one embodiment, the vehicle image generation system 110 may be deployed as a network device (e.g., a server) or a plurality of network devices collectively operating to perform customized vehicle imaging.

Communicatively coupled to control logic 120 at least partially operating as a message queue, each network device $115_i$ (i=1, 2 . . . ) is adapted to upload a message $116_i$ (i=1, 2 . . . ) to the automated vehicle image generation system 110 that prompts generation of built vehicle images. The image generation message $116_i$ includes a vehicle identification number (VIN), namely a plurality of alphanumeric characters that uniquely identify the vehicle (make/model/year/trim) for which images are requested. Hence, each network device $115_i$ (i=1, 2 . . . ) is configured to operate as a VIN source.

As a VIN source, a first network device $115_1$ may feature a dealer portal, namely an interface that allows a dealer to manually input a VIN, which is uploaded as part of the image generation message $116_1$ to the automated vehicle image generation system 110. Besides the input VIN, it is contemplated that the image generation message $116_1$ may further include a dealer code. The dealer code may be stored persistently at the first network device $115_1$ and automatically added to the image generation message $116_1$ before being uploaded to the automated vehicle image generation system 110. However, it is contemplated that the dealer code may be manually input as well. Herein, the dealer code may include a unique alphanumeric value that identifies a particular dealer operating as an agent for a vehicle manufacturer (e.g., OEM). Alternatively, the dealer code may include the media access control (MAC) address assigned to the first network device $115_1$.

In combination with the first network device $115_1$ or as the alternative, a second network device $115_2$ (data management system) may be communicatively coupled to the automated vehicle image generation system 110 and operates as another VIN source. In accordance with either a scheduled event (e.g., periodic upload, prescribed upload times, transport of a build vehicle to a dealer, etc.) or a user-initiated event (e.g., confirmed receipt of a built vehicle by a dealer, etc.), the second network device $115_2$ may upload image generation message $116_2$, which include VINs for vehicles that are part of the vehicle inventory for a particular dealer or group of dealers.

In combination with the first network device $115_1$ and/or the second network device $115_2$ (or as the alternative), a third network device $115_N$ may be communicatively coupled to the automated vehicle image generation system 110. According to one embodiment of the disclosure, the third network device $115_N$ may constitute a server at the OEM, which is configured to provide an image generation message $116_N$, which may include a plurality of VINs (and perhaps their corresponding dealer codes identifying what vehicles were shipped to which dealer), to the vehicle image generation system 110 in response to a scheduled or user-initiated event.

As shown in FIG. 1, the vehicle image generation system 110 includes the control logic 120, VIN analysis logic 130, vehicle data collection logic 140, vehicle image layering logic 150, background insertion logic 160, foreground insertion logic 170, dynamic resizing logic 180, and image delivery logic 190. Some or all of the logic units 130-190 may be part of a hardware processor deployed in a network device or operations conducted by software executed by a hardware processor in a network device or different hardware processors located in different network devices. With respect to the software embodiment, some or all of the logic units 120-190 may be software that is stored in any type of non-transitory storage medium, which is communicatively coupled to the one or more hardware processors through one or more interconnects. The one or more hardware processors execute the software to perform functionality described herein.

As shown in FIG. 1, the control logic 120 operates as a message queue to receive image generation messages $116_1$ . . . and/or $116_N$ from network devices $115_1$ . . . and/or $115_N$ operating as VIN source(s). The control logic 120 is further configured to schedule operability of logic 130-190 in order to generate customized, dealer-specific vehicle images in response to a VIN.

According to one embodiment of the disclosure, in response to receipt of a VIN that is part of the image generation messages $116_1$ . . . or $116_N$ (and/or a dealer code that may be included as part of the message $116_1$ . . . or $116_N$ or determined based on the originating VIN source $115_1$ . . . or $115_N$), the control logic 120 may conduct an initial determination as to whether composite vehicle images for a particular vehicle and dealer have been generated. This determination may be conducted by access stored data within a first (record) data store 125 for a record pertaining to a particular identified vehicle by the received VIN and a particular dealer associated with that vehicle. In the event that the composite vehicle images are already stored as part of the record in the first data store 125 for the particular dealer, the control logic 120 routes the composite vehicle images from the first data store 125 to the image delivery logic 190. The image delivery logic 190 provides the composite vehicle images to the dealer through a file transfer protocol (FTP) communication session, though a message that includes either one or more Uniform Resource Locators (URLs) each associated with a composite (resized) vehicle images, or the like, are alternative, or additional, mediums through which the vehicle images may be provided. Otherwise, at least the VIN 210 is provided via the control logic 120 to the VIN analysis logic 130.

As shown, the VIN analysis logic 130 uses the received VIN 210 to recover, from a second (build) data store 132, a vehicle trim code 230 and one or more built vehicle option codes 240 (e.g., the code(s) associated with the factory-ordered option(s) installed on the specific built vehicle uniquely identified by the VIN 210). The vehicle trim code 230 and the built vehicle option code(s) 240 are obtained from "build data" supplied by the original equipment manufacturer (OEM), where the build data provides the correlation between a VIN associated with a vehicle manufactured by the OEM and its corresponding vehicle trim code and built vehicle option codes. Stated differently, using the received VIN 210, the VIN analysis logic 130 conducts a lookup of the build data store 132, which includes multiple VINs each with associated vehicle information (e.g., year, make, model, vehicle trim, one or more built vehicle option codes and/or dealer), to obtain the vehicle trim code 230 and the built vehicle option code(s) 240 that identify factory-ordered option(s) that are installed on the vehicle identified by the received VIN 210. Although not shown, it is contemplated that the VIN analysis logic 130 may conduct a decode operation on the received VIN 210 itself, to capture information associated with the vehicle.

Figure 2:
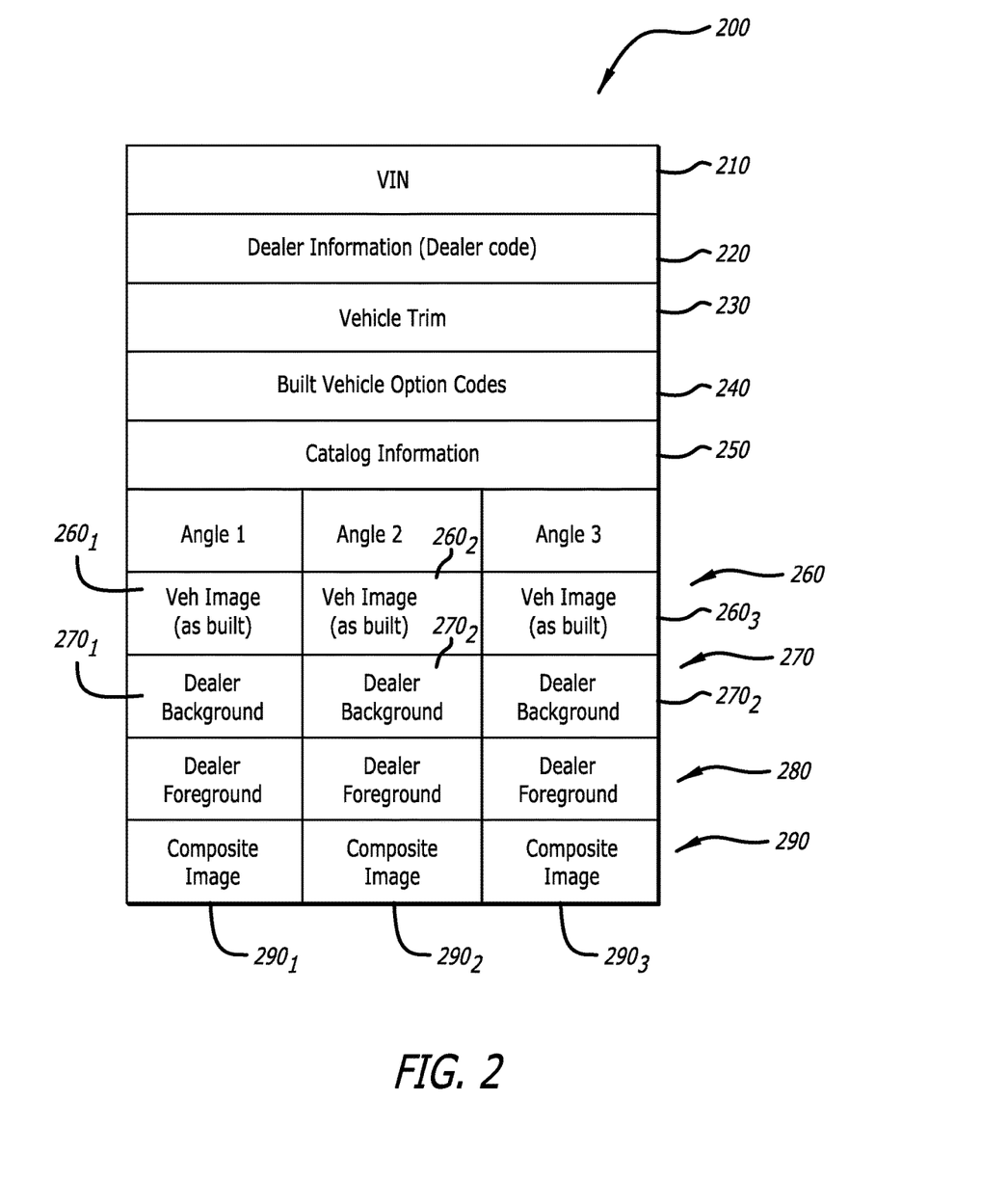
FIG. 2 is an illustrative embodiment of a record passed between logic of the automated vehicle image generation system of FIG. 1.

As shown in FIGS. 1-2, in response to receipt of the vehicle trim code 230 and the built vehicle option codes 240, the VIN analysis logic 130 generates a record 200. The record 200 may include a plurality of parameters, including but not limited or restricted to the following: (1) the VIN 210 that identifies a particular vehicle for which images are sought, (2) the dealer code 220 that identifies a specific dealer who is responsible for selling the particular vehicle, (3) the vehicle trim code 230, and/or (4) one or more option codes 240 (referred to as "option code(s)") associated with each factory-ordered option installed on the specific vehicle identified by the VIN 210. The record 200 is received by the control logic 120, which provided the record 200 (or metadata associated with that record 200) to the vehicle data collection logic 140.

Referring back to FIG. 1, in response to receiving the record 200 (or a portion thereof), the vehicle data collection logic 140 accesses one or more resources 145 (e.g., database, file system, etc.), which can be located internally within the vehicle image generation system 110 or located externally therefrom as shown (e.g., from a resource controlled by the OEM and/or a resource controlled by a third-party source). From the one or more resources (referred to as "resource(s)") 145, the vehicle data collection logic 140 obtains information that may be appended to the record 200. This information, sometimes referred to as "catalog information," may include textual information concerning the vehicle, the dealer, vehicle trim and/or the factory-ordered options for the vehicle. For instance, the catalog information 250 may include (i) awards received by the dealer or awards given to particular make/model/trim of the vehicle, (ii) detailed text descriptions of one or more factory-ordered options as provided by the one or more resources (hereinafter "resource(s)"), (iii) excerpts or full versions of published articles of the vehicle make/model corresponding to the VIN, or the like. The catalog information 250 may be appended as part of the record 200 (shown in FIG. 2), which is returned to the control logic 120.

Thereafter, the control logic 120 may provide the record 200 (or certain metadata associated at least a portion of the record 200, such as the vehicle trim code 230 and built vehicle option codes 240 for example) to the vehicle image layering logic 150. The vehicle image layering logic 150 is adapted to control the selection of images associated with different components of a vehicle from a third (image) data store 152 and the layering of the component images in accordance with a layering scheme from a fourth (overlay) data store 154 in order to render a plurality of layered vehicle images that accurately illustrate the exterior and/or the interior of the vehicle with the factory-ordered options. In general terms, the vehicle image layering logic 150 compiles different component images associated with the exterior color and/or interior color of the vehicle (as provided as part of the built vehicle option codes 240) in accordance with a selected overlay scheme, which may different for different viewing angles of the vehicle.

Herein, according to one embodiment of the disclosure, the vehicle image layering logic 150 is configured to select different component images based, at least in part, on the vehicle trim code 230 and/or built vehicle option codes 240. Different component images and/or different combinations of component images may be selected to render vehicle images having different viewing angles. Furthermore, the vehicle image layering logic 150 is further adapted to control the layering of the component images associated with each viewing angle to produce vehicle images that accurately illustrate the exterior and/or the interior of the vehicle with the factory-ordered options. The layering of the component images in different prescribed orders is based, at least in part, on the viewing angle to be captured for that vehicle image.

For instance, as an illustrative non-limiting example, the vehicle image layering logic 150 may be configured to obtain a first subset of component images 260 from the image data store 152 in order to produce a layered vehicle image associated with a first viewing angle. The first subset of component images would be arranged to overlay each other in accordance with a first ordering scheme (Z-axis overlaying) that is accessed by the vehicle image layering logic 150 from overlay data store 154. Additionally, in order to produce a vehicle image associated with a second viewing angle, the vehicle image layering logic 150 obtains a second subset of component images from the image data store 152. The second subset of component images would be arranged to overlay each other in accordance with a second ordering scheme, where the second subset of component images may differ, at least in part, from the first subset of component images and the second ordering scheme may differ, at least in part, from the first ordering scheme.

As an illustrative example, a layered built vehicle image from a rear viewing angle may utilize a first layering scheme in which a component image of a rear-facing portion of the vehicle chassis overlays a component image of an antenna since a substantial part of the antenna is visibly obstructed by the vehicle chassis when reviewing from the rear. Additionally, the layered, built vehicle image from a front viewing angle may utilize a second layering scheme instead of the first layering scheme. The reason is that, unlike the first layering scheme, the component image of the antenna may overlay a front facing image of the vehicle chassis as the antenna may visibly obstruct a small portion of the vehicle chassis.

The layered vehicle images may be provided in a Portable Network Graphics (PNG) format or any other selected image format. Similarly, the record 200 may be updated to include these layered vehicle images 260 for any number M (M≥1) of viewing angles. For illustrative purposes, three viewing angles are captured in record 200 of FIG. 2. Besides the layering of component images, as optional functionality, it is contemplated that the particular subset of component images may also undergo an orientation change (e.g., vertical or horizontal shifting, image inversing, rotating, etc.) instead of storing a component image for each viewing angle, especially when a large number of viewing angles is available (e.g., M≥100) and the difference between neighboring viewing angles is only a few rotational degrees in the horizontal or vertical direction.

The background insertion logic 160 is communicatively coupled to the control logic 120 to receive the updated record 200 including the layered vehicle images 260 having different viewing angles (or certain metadata associated with at least a portion of the record 200, such as the dealer code 220 for example). Responsive to receiving the dealer code 220 included as part of the record 200, the background insertion logic 160 retrieves one or more dealer-specific background images 270 associated with the dealer identified by the dealer code 220 from a fifth (background) data store 162. A selected dealer-specific background image 270 may be used as background for an above-described layered vehicle image, where the particular background image 270 may be selected based on the particular viewing angle. The one or more resultant updated vehicle images may be temporarily appended as part of the record 200.

In particular, as shown in FIG. 2, a first type of dealer-specific background $270_1$ may be associated with a layered vehicle image $260_1$ oriented in accordance with a first viewing angle while a second type of dealer-specific background image $270_2$ may be associated with a layered vehicle image $260_2$ oriented in accordance with a second viewing angle and the same second type of dealer-specific background image $270_2$ may be associated with a layered vehicle image $260_3$ oriented in accordance with a third viewing angle.

According to one embodiment of the disclosure, responsive to receiving the dealer code 220, the background insertion logic 160 may further generate an updated vehicle image (not shown), where a first layered vehicle image $260_1$ may be positioned to overlay a first type of dealer-specific background image $270_1$. Additionally, the background insertion logic 160 may further generate one or more other updated vehicle images, such as updated vehicle image (not shown) in which the second layered vehicle image $260_2$ may be positioned to overlay a second type of dealer-specific background image $270_2$. The updated vehicle images include a customized, dealer specific background in efforts to differentiate one dealer from another and perhaps provide contextual information that may be useful by the potential customer (e.g., image of the dealership from the street, mountainous terrain for a vehicle with off-road capabilities, etc.).

Performed in combination with selection of the dealer-specific background images 270, the foreground insertion logic 170 is communicatively coupled to the control logic 120 to receive the updated record 200, including the dealer-specific background 270 and perhaps the updated vehicle images with the different viewing angles. Alternatively, as described above, certain metadata associated at least a portion of the record 200, such as the dealer code 220 and updated vehicle images for example, may be supplied to the foreground insertion logic 170. Based on this certain metadata, the foreground insertion logic 170 may produce composite vehicle images, which are based on the dealer-specific foreground images and updated vehicle images, and provide such information to the control logic 120. As shown, such information is provided as part of the updated record 200.

Herein, responsive to receiving the dealer code 220 included as part of the updated record 200, the foreground insertion logic 170 retrieves dealer-specific foreground data 280 from a data store 172. The dealer-specific foreground data 280 may include dealer-specific advertisement material (e.g., logo, contact/address information, lot number, etc.) which may be applied at one or more desired areas of the updated vehicle images in order to produce composite vehicle images 290, which may be substituted for the updated vehicle images in the record 200. The dealer-specific foreground data 280 may further include certain catalog information 250 (contained in the record 200) that may be positioned at a different area of the updated vehicle image 290 or placed within a separate image that accompanies the composite vehicle images 290.

The record 200 (or composite vehicle images 290 along with the dealer code 220) may be provided from the control logic 120 to dynamic resizing logic 180, which controls any resizing of the composite images in accordance with the needs of the specific dealer. For instance, in accordance with the dealer-sizing preferences 292 set forth in data store 182, a composite vehicle images having a first resolution (2048× 1028 pixels) may be resized with a second resolution (800×600) lesser than the first resolution based on the intended use of the vehicle image by the dealer. For instance, images for display on mobile applications may undergo a reduced resolution to resize the image for faster rendering on a targeted device (e.g., smartphone). According to one embodiment of the disclosure, the resized composite images may be stored in the record 200 (e.g., overwriting the composite images) and subsequently provided to the image delivery logic 190 for transmission to the dealer. Of course, the resizing of the composite vehicle images may be conducted prior to delivery to the dealer while the non-resized composite vehicle images being stored as part of the record 200 in record data store 125.

These resized composite vehicle images are made available by the image delivery logic 190 to the dealer through a message 294 that includes either one or more Uniform Resource Locators (URLs) each associated with a resized composite vehicle image or the resized composite vehicle images themselves.

Figure 3:
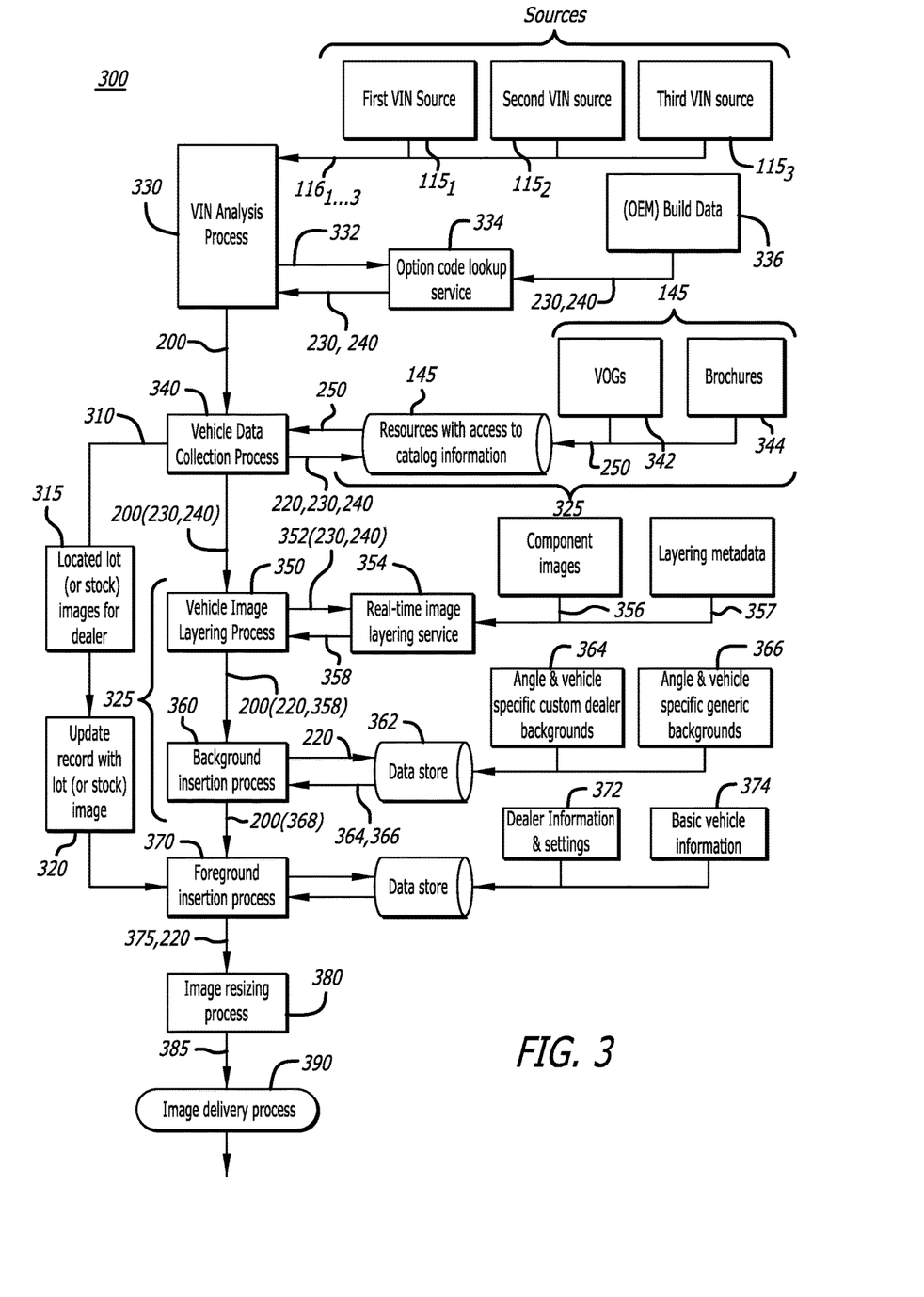
FIG. 3 is an illustrative embodiment of exemplary operations conducting in a process flow of the exemplary automated vehicle image generation system of FIG. 2.

Referring now to FIG. 3, an illustrative embodiment of exemplary operations conducting in a process flow 300 conducted by the automated vehicle image generation system 100 of FIG. 1 is shown. Herein, the process flow 300 is commenced in response to receipt of an uploaded image generation message 116 from a VIN source. Herein, the image generation message 116 includes a VIN associated with the vehicle and/or the dealer code.

As shown in FIG. 3, the uploaded image generation message 116 may be provided to the automated vehicle image generation system from any of a plurality of sources 115, including a first VIN source $115_1$, a second VIN source $115_2$, or a third VIN source $115_3$. According to one embodiment of the disclosure, the first VIN source $115_1$ may operate as a dealer portal, namely an interface that allows a dealer to manually input a VIN, which is uploaded as part of the image generation message 116 to the automated vehicle image generation system. As stated above, besides the input VIN, it is contemplated that the image generation message 116 may further include a dealer code.

As further shown, the second VIN source 1152 may operate as a data management system while the third source $115_3$ may constitute a server at the OEM. In response to an event, such as a scheduled event or a user-initiated event, the second VIN source $115_2$ may be configured to upload VINs for vehicles that are part of the vehicle inventory for a particular dealer or group of dealers. For instance, the VINs may be directed to (i) vehicles that have been recently added to the vehicle inventory for the particular dealer since the last update, (ii) a selected subset of vehicles that are part of the vehicle inventory for that particular dealer, or (iii) all vehicles within the vehicle inventory. Similarly, in response to an event, the third VIN source 1153 may be configured to provide a plurality of VINs (perhaps categorized by associated dealer code that identifies what vehicles were shipped to which dealers) to the vehicle image generation system for use in creating vehicle images that are subsequently supplied to the dealers.

Referring still to FIG. 3, the vehicle image generation system operates in accordance with a VIN analysis process 330, a vehicle data collection process 340, a vehicle image layering process 350, a background insertion process 360, a foreground insertion process 370, an image resizing process 380 and an image delivery process 390. These processes 330-390 may correspond to functionality of the logic units 130-190 of FIG. 1, namely operations conducted to logic that may be part of a hardware processor deployed in a network device or operations conducted by software executed by a hardware processor in a network device or different hardware processors located in different network devices. Some or all of these processes 330-390 represent, at least in part, the functionality associated with corresponding logic implemented as hardware within the vehicle image generation system or the functionality that is based on the execution of such logic, which may be software processed by one or more hardware processors and stored in any type of non-transitory storage medium communicatively coupled to the one or more hardware processors.

Responsive to receipt of the image generation message 116, the VIN analysis process 330 is configured to initiate a request message 332, which includes the received VIN 210, to an option code lookup service 334. More specifically, responsive to the request message 332, the option code lookup service 334 accesses the build data 336 provided from the vehicle OEM in order to obtain the vehicle trim 230 and/or one or more built vehicle option codes 240 associated with the factory-ordered options that are installed on the vehicle identified by the received VIN 210. Hence, using the received VIN 210 from the request message 332, the VIN analysis process 330 signals the option code lookup service 334 to conduct a lookup of the build data 336 to obtain the vehicle trim 230 and the built vehicle option codes 240, which are returned to the VIN analysis process 330.

Figure 4:
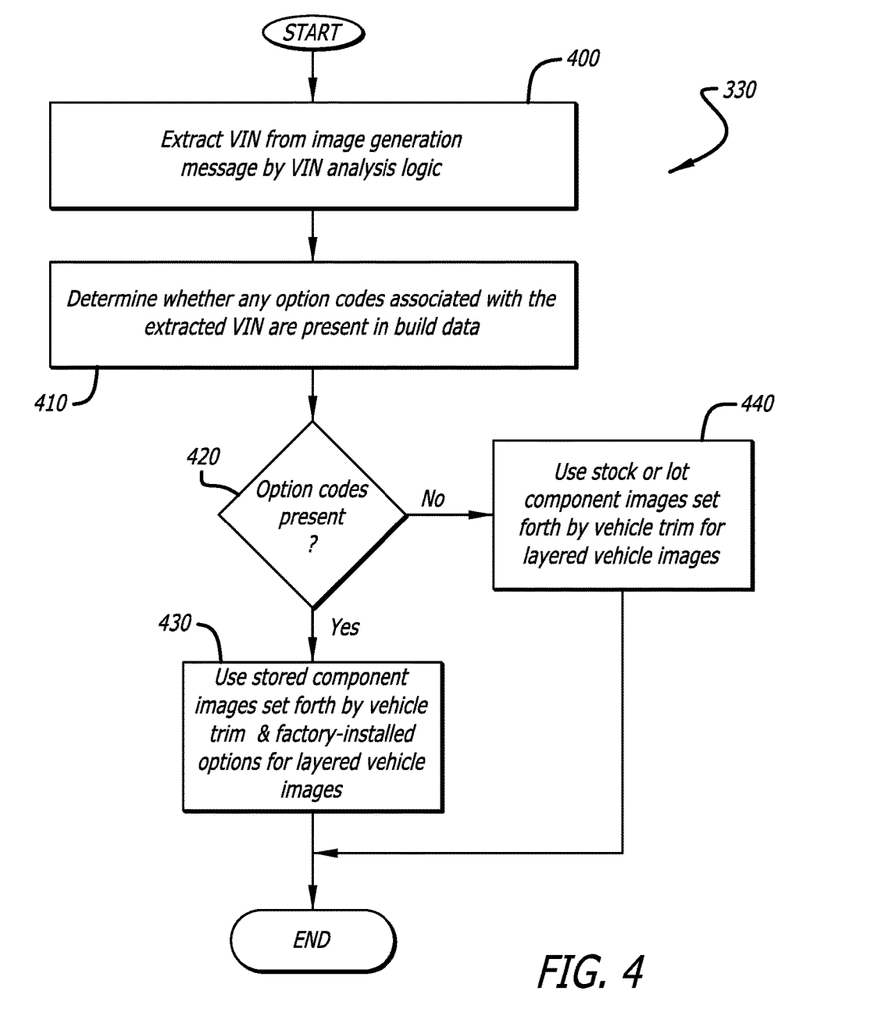
FIG. 4 is an illustrative embodiment of a VIN analysis and record creation process set forth in the process flow of FIG. 3.

FIG. 4 illustrates, at least in part, the operability of the VIN analysis process 330 of FIG. 3. Herein, the VIN(s) is extracted from the image generation message and a determination is made as to whether any built vehicle option codes associated with the extracted VIN are present (blocks 400 and 410). If so, the built vehicle option codes are received for subsequent use in identifying certain images directed to factory-installed options on the vehicle that may be substituted for images related to standard components that may be identified through the vehicle trim (blocks 420 and 430). If no option codes are present, the layered vehicle images will be solely based on stock or lot component images that depict standard components for the vehicle in accordance with the vehicle trim (blocks 420 and 440).

Referring back to FIG. 3, as an illustrative example, a vehicle may include a plurality of factory-ordered options, including a navigation system, heated leather seats, and Xenon lighting. One or more option codes may be assigned to each of these factory-ordered options. For instance, one option code (OC_1) may be assigned to Xenon lighting; one option code (OC_2) may be assigned to leather seat interior while another option code (OC_3) may be assigned to the leather seats with heating elements; and one option code (OC_4) may be assigned to the navigation system or separate option codes may be assigned to different components of the navigation system (e.g., option codes directed to a stock radio "OC_4A", a compact disc player "OC_4B", pop-up navigation screen forming the navigation system "OC_4C"). Using the VIN 210, the option code lookup service 334 obtains the built vehicle option codes 240 (e.g., OC_1, OC_2, OC_3 & OC_4) associated with the specific vehicle identified by the VIN 210.

In response to receipt of the vehicle trim 230 and built vehicle option codes 240, the VIN analysis process 330 generates the record 200 of FIG. 2, which may include the following parameters: (1) the VIN 210 of FIG. 2 that identifies a particular vehicle for which images are sought, (2) the dealer code 220 of FIG. 2 that identifies a specific dealer who is responsible for selling the particular vehicle, (3) the vehicle trim code 230, and (4) the built vehicle option code(s) 240 associated with each factory-ordered option installed on the specific vehicle identified by the VIN 210. The record 200 is provided to the vehicle data collection process 320.

Referring still to FIG. 3, in response to receiving the record 200, the vehicle data collection process 340 accesses textual (catalog) information concerning (a) the vehicle (e.g., miles per gallon, safety rating, etc.) or its components (e.g., engine, speakers, etc.), (b) the dealer, (c) vehicle trim (e.g., text directed to the particular trim package, etc.), and/or (d) the factory-ordered options for the vehicle. More specifically, the vehicle data collection process 340 may access the catalog information 250 from one or more resources 145 of FIG. 1 based on the particular parameters set forth in the record 200. The catalog information 250 may include vehicle ordering guide (VOG) 342 including information for purchasing the vehicle, brochure descriptions 344, third-party articles, etc.). The catalog information 250 may be appended as part of the record 200 as shown in FIG. 2.

Figure 5:
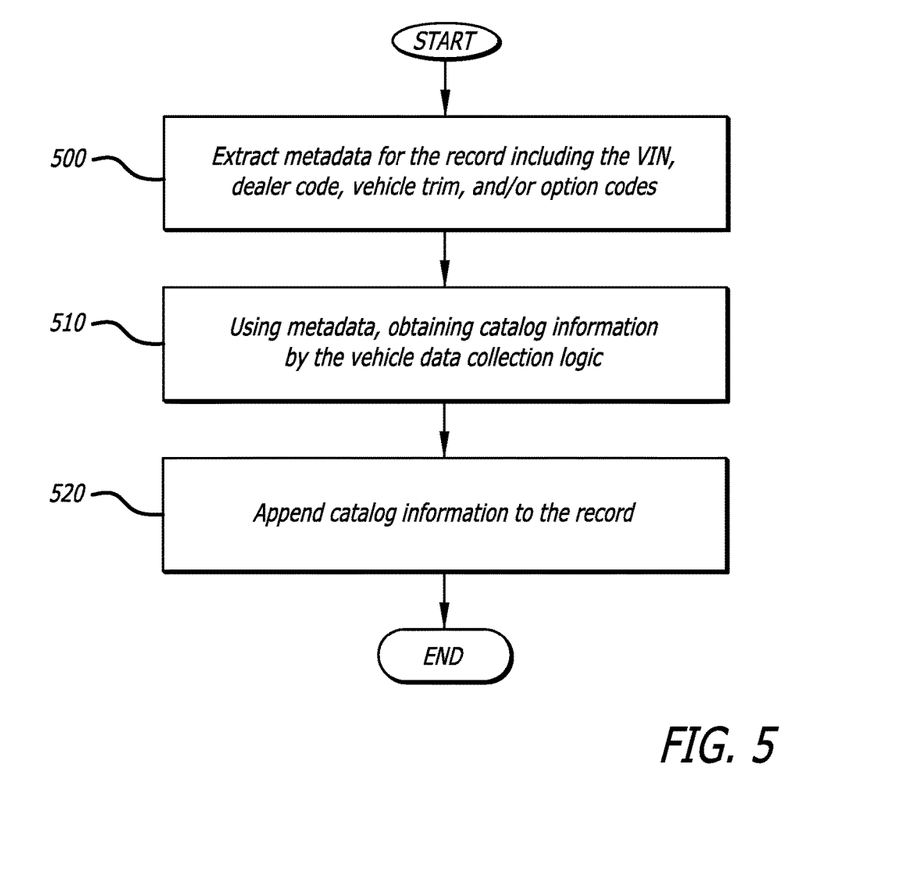
FIG. 5 is an illustrative embodiment of a vehicle data collection process set forth in the process flow of FIG. 3.

More specifically, as shown in FIG. 5, in response to receiving the record 200, the vehicle data collection process 340 may extract metadata from the records including the VIN, dealer code, vehicle trim, and/or option codes (block 500). Using some or all of the extracted metadata, the catalog information 250 is obtained from one or more resources, where the catalog information 250 may be temporarily appending to the record 200 and, at least part of the catalog information 250, may be used as foreground information overlaying the vehicle image (blocks 510 and 520).

Returning back to FIG. 3, in the event that "lot" (or "stock") images are used for the vehicle as represented by path 310, these images associated with the dealer identified by the dealer code are located and appended to the record 200 to form an updated record (blocks 315 and 320). In the event that layered vehicle images are to be created, as represented by path 325, metadata associated at least a portion of the record 200 of FIG. 2 (e.g., vehicle trim 230 and/or option codes 240 of record 200) is provided to the vehicle image layering process 350. The vehicle image layering process 350 is adapted to control the selection and layering of images associated with different components of a vehicle based on the vehicle trim 230, option code(s) 240 and/or the selected viewing angle for the vehicle image.

Figure 6:
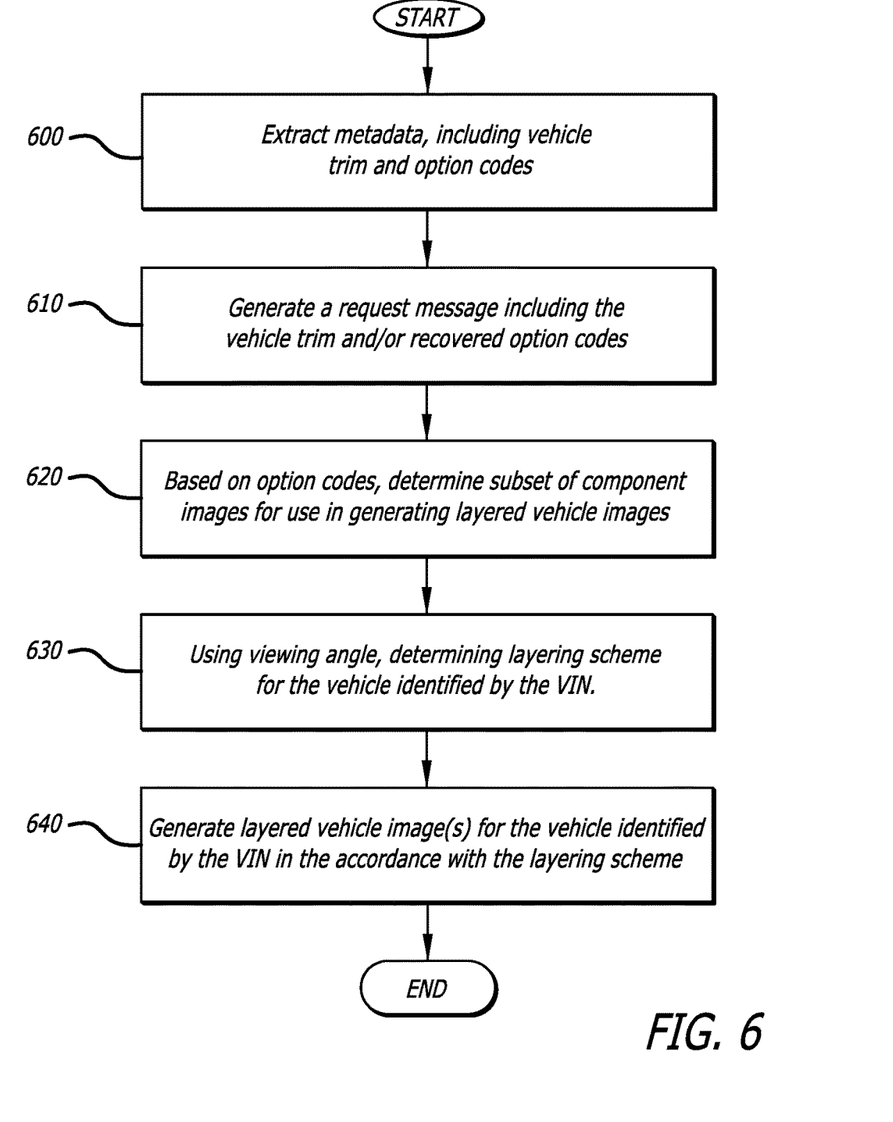
FIG. 6 is an illustrative embodiment of a vehicle image layering process set forth in the process flow of FIG. 3.

In particular, as shown in FIGS. 3 & 6, the vehicle image layering process 350 initiates a request message 352 to a real-time image layering service 354, where the request message 352 includes at least the vehicle trim 230 and the built vehicle option codes 240 obtained from the build data 336 (see blocks 600 and 610).

Herein, the real-time image layering service 354 utilizes the vehicle trim 230 for selecting a set of component images that are associated with a particular make/model/trim of the vehicle identified by the vehicle trim 230. The real-time image layering service 354 further utilizes the built vehicle option code(s) 240 for selecting a subset of the set of component images 356 that are needed to accurately illustrate the exterior and/or the interior of a specific vehicle with its factory-ordered options (see block 620).

Additionally, based at least in part on the viewing angle, the real-time image layering service 354 obtains one or more layering schemes 357 for these component images as different ordering and orientation in overlaying component images may be required to render different factory-ordered options as perceived from different viewing angles (see block 630 of FIG. 6). In general terms, the layering scheme identifies an ordering of the overlaying of component images (Z-axis overlaying). Therefore, the real-time image layering service 354 produces layered vehicle images 358 from the subset of component images in accordance with the selected layering scheme (see block 640 of FIG. 6). The record 200 may be updated to include these layered vehicle images 358 associated with the particular VIN.

Figure 7:
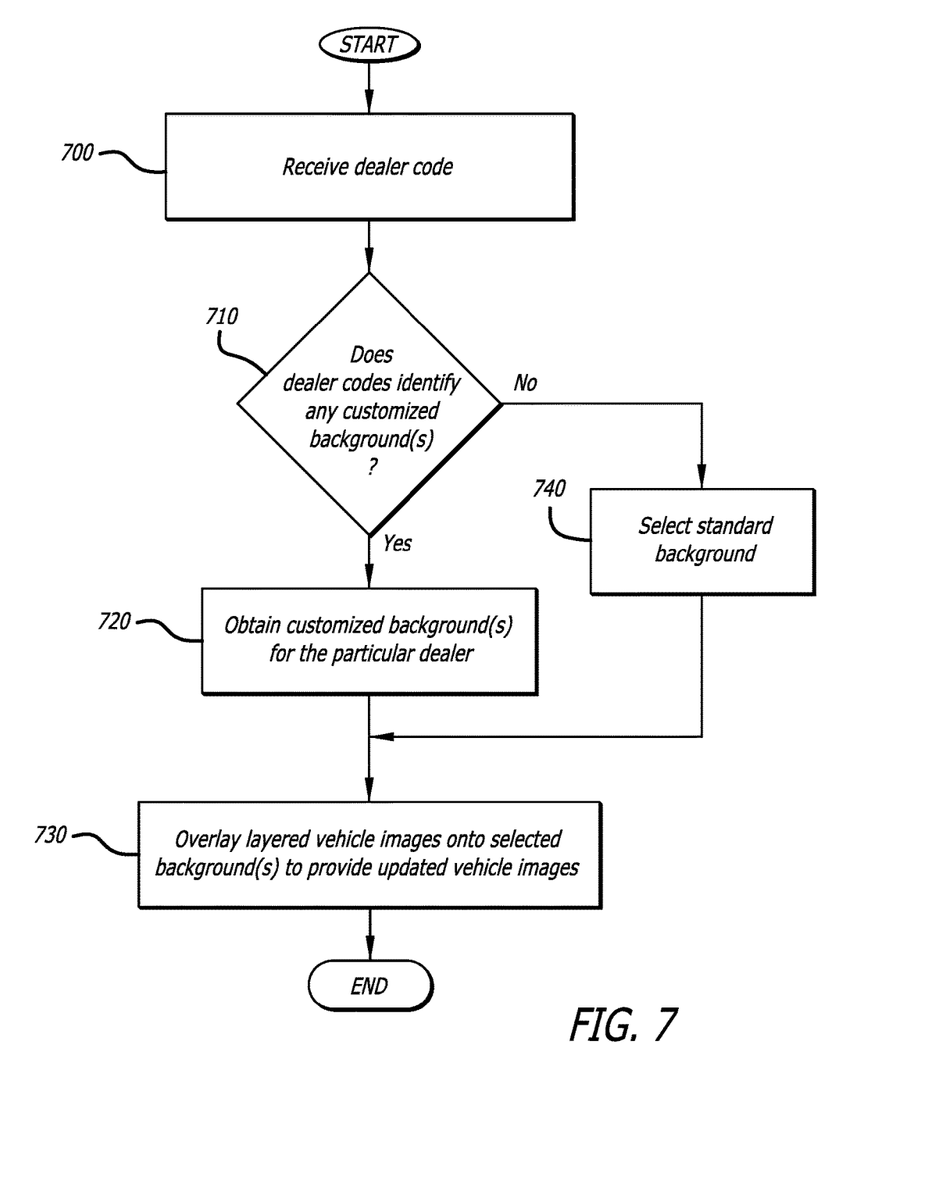
FIG. 7 is an illustrative embodiment of a dealer-specific background insertion process set forth in the process flow of FIG. 3.

More specifically, as shown in FIGS. 3 & 7, in response to receiving the record 200 including the dealer code 220, the background insertion process 360 retrieves one or more dealer-specific backgrounds for the layered vehicle images 358. In particular, the background insertion process 360 extracts the dealer code 220 from the record 200 and accesses a data store 362 to uncover whether one or more dealer-specific backgrounds 364 for the particular dealer are present (see blocks 700 and 710 of FIG. 7). If so, dealer-specific background(s) 364 are provided to the background insertion process 360 so that each layered vehicles image 358 may be positioned to overlay a particular dealer-specific background 364 to create one or more updated layered vehicle images (referred to as "updated vehicle image(s)") 368, as described in blocks 720 and 730 of FIG. 7. The updated vehicle image(s) 368 include customized, dealer specific backgrounds in efforts to differentiate one dealer from another and perhaps provide contextual information that may be useful by the potential customer (e.g., image of the dealership from the street, mountainous terrain for a vehicle with off-road capabilities, etc.).

Where dealer-specific backgrounds 364 are not present, a generic (or standard) background 366 may be provided to the background insertion process 360 (see block 740 of FIG. 7). Herein, the generic background 366 may be location specific (e.g., showing notable landmark in region, familiar areas in the region, etc.), but perhaps universally used by more than one dealer.

Performed concurrently with or after customization of the background, the updated vehicle image(s) 368 may undergo a foreground change by the foreground insertion process 370. The foreground insertion process 370 is responsible for controlling an overlay of data, which is specific to the dealer, on the updated vehicle image(s) 368 to further customize the vehicle images for a particular dealer. For instance, the foreground may include dealer-specific advertisement material 372 (e.g., logo, contact/address information, lot number, etc.) that is selectively positioned at one or more desired areas of the updated vehicle image in order to produce a composite image of the vehicle. The foreground may further include certain vehicle information 374, including catalog information (contained in the record 200), which may be positioned at a different area of the updated vehicle image or placed within a separate image that accompanies the composite vehicle images.

The composite vehicle images 375 along with the dealer code 220 may be provided to the dynamic resizing process 380, which controls any resizing of the composite vehicle image(s) 375 in accordance with the needs of the specific dealer. For instance, a composite vehicle image 375 having a first resolution (2048×1028 pixels) may be resized to a second resolution (800×600) lesser than the first resolution based on the intended use of the vehicle image by the dealer. For instance, images for display on mobile applications may undergo a reduced resolution to resize the image for faster rendering on a targeted device (e.g., smartphone). These resultant images 375 are made available to the dealer through a message that includes either one or more Uniform Resource Locators (URLs) each associated with a composite vehicle image or the composite vehicle images themselve

What is claimed is:

1. A system comprising:
    one or more processors; and
    a memory communicatively coupled to the one or more processors, the memory including:
    a vehicle image layering logic that, in response to receiving information that uniquely identifies a vehicle, renders, on an electronic display, a vehicle image depicting the vehicle by at least partially overlaying a first set of component images on one another in accordance with a prescribed layering scheme, each component image of the first set of component images being a stored digital image of a component of the vehicle, the vehicle image having a first aspect ratio resolution based on the electronic display and rendered according to a selected viewing angle, a background insertion logic that, in response to receiving a code that identifies a dealer and the vehicle image, overlaying the vehicle image over a dealer-specific background image to produce an updated vehicle image, and a dynamic resizing logic configured to dynamically resize the updated vehicle image from the first aspect ratio resolution to a second aspect ratio resolution, wherein the first aspect ratio resolution and the second aspect ratio resolution are defined in pixels.

2. The system of claim 1, wherein the information that uniquely identifies the vehicle includes a vehicle identification number.

3. The system of claim 2, wherein the memory further comprises analysis logic that, in response to receipt of the vehicle identification number, obtains one or more built vehicle option codes and vehicle trim information associated with the vehicle.

4. The system of claim 3, wherein the vehicle image layering logic, in response to receiving information including the one or more built vehicle option codes and the vehicle trim information, selecting the first set of component images for use in the rendering, the first set of the component images being a first subset of a plurality of stored component images.

5. The system of claim 4, wherein the vehicle image layering logic generates the vehicle image as a first vehicle image of a plurality of images of the vehicle, the first vehicle image representing a first viewing angle of the vehicle and being formed by (i) the first set of component images being the first subset of the plurality of stored component images forming the vehicle and (ii) the first set of component images being layered in accordance with the prescribed layering scheme of one or more prescribed layering schemes.

6. The system of claim 5, wherein the vehicle image layering logic to generate a second vehicle image of the plurality of vehicles images representing a second viewing angle of the vehicle differing from the first viewing angle, the second vehicle image being formed by a second set of component images forming the vehicle in accordance with the second viewing angle and the second set of component images being layered in accordance with a second prescribed layering scheme that differs from the first prescribed layering scheme of the one or more prescribed layering schemes.

7. The system of claim 1, wherein the memory further comprises a foreground insertion logic that, in response to receiving the code that identifies the dealer and the first vehicle image, overlaying information that identifies the dealer over portions of the updated vehicle image.

8. The system of claim 1, wherein the prescribed layering scheme is automatically determined based on the selected viewing angle.

9. The system of claim 1, wherein the vehicle image layering logic that, in response to receiving a second selected viewing angle, renders, on the electronic display, a second vehicle image according to the second selected viewing angle.

10. A system for automatically generating displayable images of a vehicle, the system comprising:

one or more processors; and a memory communicatively coupled to the one or more processors, the memory including:

analysis logic that, in response to receipt of information that uniquely identifies the vehicle, obtains one or more built vehicle option codes and vehicle trim information associated with the vehicle, and a vehicle image layering logic that, in response to receiving information including the one or more built vehicle option codes and the vehicle trim information, renders, on an electronic display, a vehicle image depicting the vehicle based at least partially overlaying a plurality of component images on one another in accordance with a first layering scheme, each component image of the plurality of component images being a stored digital image of a component of the vehicle, the vehicle image having a first aspect ratio resolution based on the electronic display and rendered according to a selected viewing angle, a background insertion logic that, in response to receiving a code that identifies a dealer and the vehicle image, overlaying the vehicle image over a dealer-specific background image to produce an updated vehicle image, and a dynamic resizing logic configured to dynamically resize the updated vehicle image from the first aspect ratio resolution to a second aspect ratio resolution, wherein the first aspect ratio resolution and the second aspect ratio resolution are defined in pixels.

11. The system of claim 10, wherein the information that uniquely identifies the vehicle includes a vehicle identification number.

12. The system of claim 10, wherein the vehicle image layering logic to generate the vehicle image being a first vehicle image of a plurality of images of the vehicle, the first vehicle image representing a first viewing angle of the vehicle.

13. The system of claim 12, wherein the vehicle image layering logic renders a second vehicle image of the plurality of vehicle images representing a second viewing angle of the vehicle differing from the first viewing angle, the second vehicle image being formed by a second plurality of component images forming the vehicle in accordance with the second viewing angle and the second plurality of images being layered in accordance with a second layering scheme that differs from the first layering scheme of the one or more layering schemes.

14. The system of claim 13, wherein the logic further comprises a foreground insertion logic that, in response to receiving a code that identifies the dealer and the first vehicle image, overlaying information that identifies the dealer over portions of the updated vehicle image.

15. The system of claim 10, wherein the first layering scheme is automatically determined based on the selected viewing angle.

16. The system of claim 10, wherein the vehicle image layering logic that, in response to receiving a second selected viewing angle, renders, on the electronic display, a second vehicle image according to the second selected viewing angle.

17. A computerized method for automatically generating displayable images of a vehicle, the system comprising:

obtaining information associated with the vehicle, the information includes one or more built vehicle option codes and vehicle trim information associated with the vehicle;

responsive to receiving the information including the one or more built vehicle option codes and the vehicle trim information, rendering, on an electronic display, a first layered image depicting the vehicle by at least partially overlaying a plurality of vehicle sub-images on one another, each of the plurality of vehicle sub-images (i) associated with a component of the vehicle, (ii) being at least partially selected by the one or more built vehicle option codes, and (iii) stored as a digital image, wherein the overlaying is performed in accordance with a prescribed layering scheme associated with the vehicle trim;

responsive to receiving a code that identifies a dealer and the vehicle image, overlaying the first layered image over a dealer-specific background image to produce an updated vehicle image; and dynamically resizing the updated vehicle image from a first aspect ratio resolution to a second aspect ratio resolution, wherein the first aspect ratio resolution and the second aspect ratio resolution are defined in pixels.

18. The computerized method of claim 17, wherein the obtaining the information associated with the vehicle is in response to receiving a vehicle identification number.

19. The computerized method of claim 17 further comprising:

responsive to receiving the dealer code and the updated vehicle image, generating a composite vehicle image by overlaying information that identifies the dealer over one or more portions of the updated vehicle image.

20. The computerized method of claim 17, wherein in response to receiving information pertaining to a second selected viewing angle, rendering, on the electronic display, a second layered image according to the second selected viewing angle.

* * * * *